United States Patent [19]
Stoll

[11] Patent Number: 5,960,560
[45] Date of Patent: Oct. 5, 1999

[54] THERMAL SOLAR DEHYDRATOR

[76] Inventor: Fedna Stoll, Scabiosastraat 4, P.O. Box 9482, Paramaribo, Suriname

[21] Appl. No.: 08/989,053

[22] Filed: Dec. 11, 1997

[51] Int. Cl.⁶ ..................................................... F26B 13/10
[52] U.S. Cl. .................................. 34/529; 34/540; 34/93; 34/212
[58] Field of Search .............................. 34/512, 522, 529, 34/540, 93, 211, 237; 204/157.15, 158.2; 126/619, 620, 646

[56] References Cited

U.S. PATENT DOCUMENTS

| | | | |
|---|---|---|---|
| 3,711,959 | 1/1973 | Van Der Lely | 34/102 |
| 3,955,488 | 5/1976 | Wheeler . | |
| 4,192,081 | 3/1980 | Erickson et al. . | |
| 4,245,398 | 1/1981 | Poisson . | |
| 4,329,789 | 5/1982 | Erickson | 34/93 X |
| 4,501,074 | 2/1985 | O'Hare | 34/93 |
| 4,534,118 | 8/1985 | Cabus et al. . | |
| 5,584,127 | 12/1996 | Sutherland | 34/93 |

*Primary Examiner*—Henry Bennett
*Assistant Examiner*—Steve Gravini
*Attorney, Agent, or Firm*—Michael I. Kroll

[57] ABSTRACT

A thermal solar dehydrator (16) comprising en enclosure (18) having a plurality of drying chambers (20) therein. A plurality of perforated trays (22) are provided. A plurality of runners (24) support the perforated trays (22) in vertically spaced apart relationships within the drying chambers (20) of the enclosure (18), so that food can be placed upon the perforated trays (22). A structure (26) is for forcing air into and out of the drying chambers (20). An assembly (28) is for allowing sunlight (30) to penetrate the enclosure (18) and heat up the air passing through the drying chambers (20), so that the food placed upon the perforated trays (22) will dehydrate.

14 Claims, 14 Drawing Sheets

THERMAL SOLAR DEHYDRATOR

BACKGROUND OF THE INVENTION

1. Field of the Invention

The instant invention relates generally to food treating apparatuses and more specifically it relates to a thermal solar dehydrator. The thermal solar dehydrator in a first embodiment uses a passive solar design in an enclosure with drying chambers, so that food placed on perforated trays therein will be dehydrated. A second embodiment uses an active system whereby photovoltaic cells on the roof of the enclosure converts sunlight into electricity, which is stored in batteries to operate heat lamps in the drying chambers and the fans of the air conduit system which circulates hot air in the drying chambers.

2. Description of the Prior Art

Numerous food treating apparatuses have been provided in prior art. For example, U.S. Pat. No. 3,955,488 to Wheeler; U.S. Pat. No. 4,192,081 to Erickson et al.; U.S. Pat. No. 4,245,398 to Poisson and U.S. Pat. No. 4,534,118 to Cabus et al. all are illustrative of such prior art. While these units may be suitable for the particular purpose to which they address, they would not be as suitable for the purposes of the present invention as heretofore described.

WHEELER, JACK I.

FOOD DEHYDRATER

U.S. Pat. No. 3,955,488

A dehydrater for removing the majority of the liquid content of foods. The dehydrater utilizes an outer shell adapted to enclose the food being dehydrated and incorporates appropriate venting to permit the circulation of air within and through the unit. The food is placed within the unit upon slidable shelves or drawers which, although substantially solid, are provided with critically spaced and sized holes to permit adequate and even flow of heated air therethrough. The particular combination of vents assures that the food products on any given shelf are uniformly dried and that the temperature distribution within the cabinet is in accordance with the requirements. The heat for the dehydration is provided by a single heating unit placed in the bottom of the dehydrater and adapted and configured to provide the particular amount of heat necessary.

ERICKSON, CHAD S.

DORNBUSH, DAVID A.

FOOD DEHYDRATING MACHINE

U.S. Pat. No. 4,192,081

A machine for dehydrating food, as an aid toward preservation of food for extended periods of time. Intake air may be obtained from either the exterior of the machine or a combination of exterior and recycled air. Intake air is electrically heated and pressurized in a plenum chamber by a fan. The pressurized and heated air is released in a uniform laminer flow through a set of small openings, thence along horizontally disposed shelves containing the food to be dried. The air is then selectively discharged into the atmosphere or a portion thereof is recycled and combined with new intake air and again passed over the food to be dehydrated. The percentage of recycled air is selectively variable over a wide range. Removable frames support either solid sheets or screens having mesh openings of desired sizes which support the food to be dried. The choice of a solid sheet or the mesh size depends upon the type of food to be dried. The intake air is filtered and the electrical heater is temperature controlled by a thermister-triac combination of bimetallic thermostat which senses the temperature within the plenum and controls the current flowing through the electrical heating element.

POISSON, LEANDRE A.

SOLAR DEHYDRATOR

U.S. Pat. No. 4,245,398

Apparatus and process for utilizing solar heat for dehydrating all forms of vegetable matter.

CABUS, MARCELLO M.

HOWARD, BILLY D.

COLT, JAMES W.

TUFT, EDWARD S.

SOLAR-ASSISTED MOBILE FOOD DEHYDRATOR

U.S. Pat. No. 4,534,118

The cost of preserving and transporting food is minimized, to the end that food may be made more widely available. A trailer, movable by a small vehicle, houses a completely self-contained food dehydration plant which can be towed to the field in order to preserve the food as soon as it is harvested. The plant dehydrates by blowing a stream of hot air over the food. In order to conserve energy, the air if preheated both in a solar collector (by sunlight) and in a heat exchanger (by exhaust air). Some air used for dehydration is not exhausted, but instead is recirculated through the plant, further contributing to efficiency.

SUMMARY OF THE INVENTION

A primary object of the present invention is to provide a thermal solar dehydrator that will overcome the shortcomings of the prior art devices.

Another object is to provide a thermal solar dehydrator in which a first embodiment uses a passive solar design, where an enclosure having exterior side walls consisting of a frame having outer transparent panel spaced from inner black panel will form a plenum thereabout with drying chambers, so that food placed on perforated trays supported therein will be dehydrated.

An additional object is to provide a thermal solar dehydrator in which a second embodiment uses an active system, whereby sunlight converted through the use of photovoltaic cells on the roof of the enclosure into electricity and stored in batteries, will operate heat lamps and the fans mounted in air intake pipes of the air conduit system for circulating the hot air within the drying chambers.

A further object is to provide a thermal solar dehydrator that is simple and easy to use.

A still further object is to provide a thermal solar dehydrator that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DESCRIPTION OF THE PREFERRED EMBODIMENTS

Figure 1:
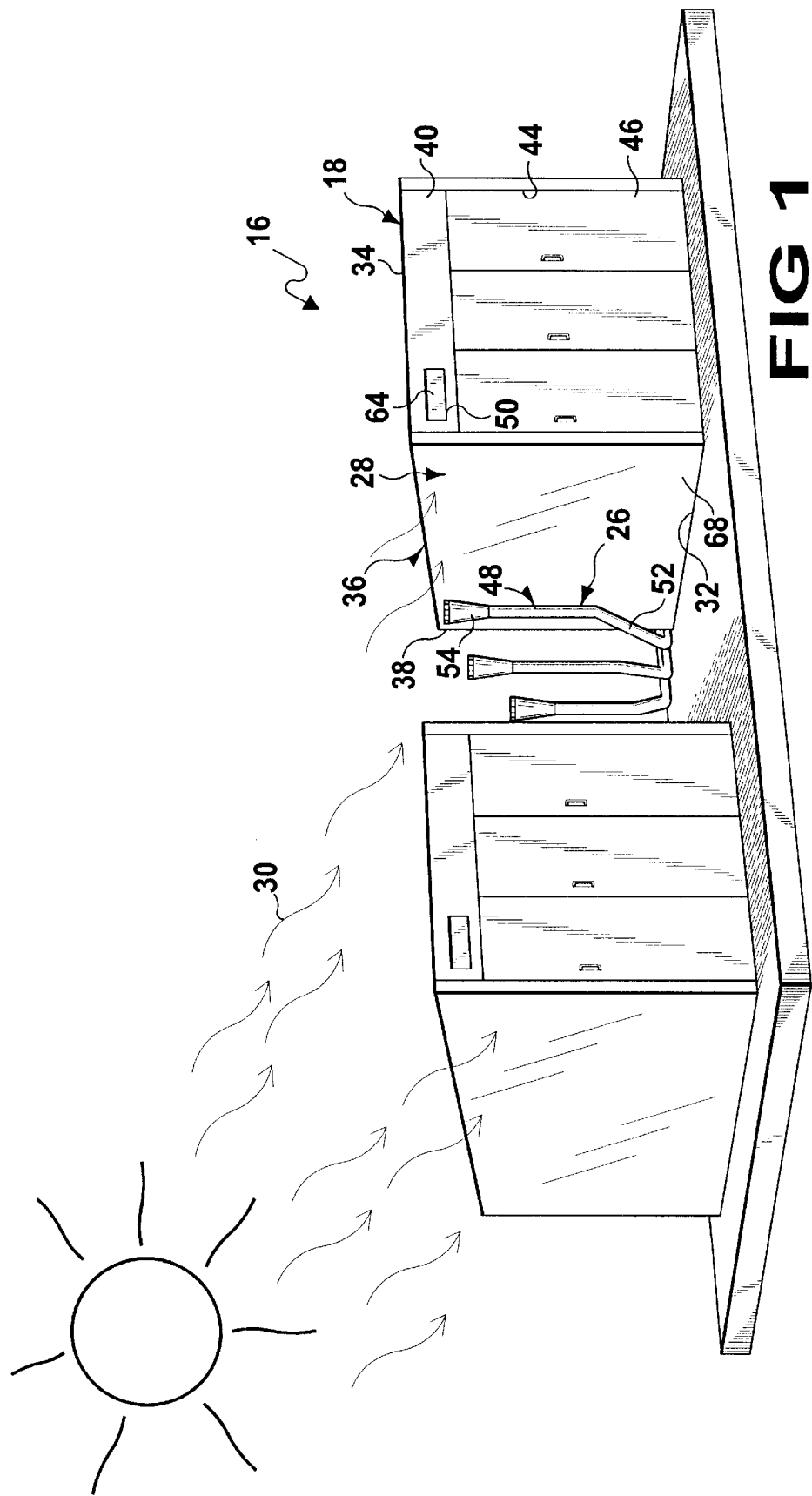
FIG. 1 is a perspective view of a first embodiment of the present invention next to a storage cabinet.
Figure 2:
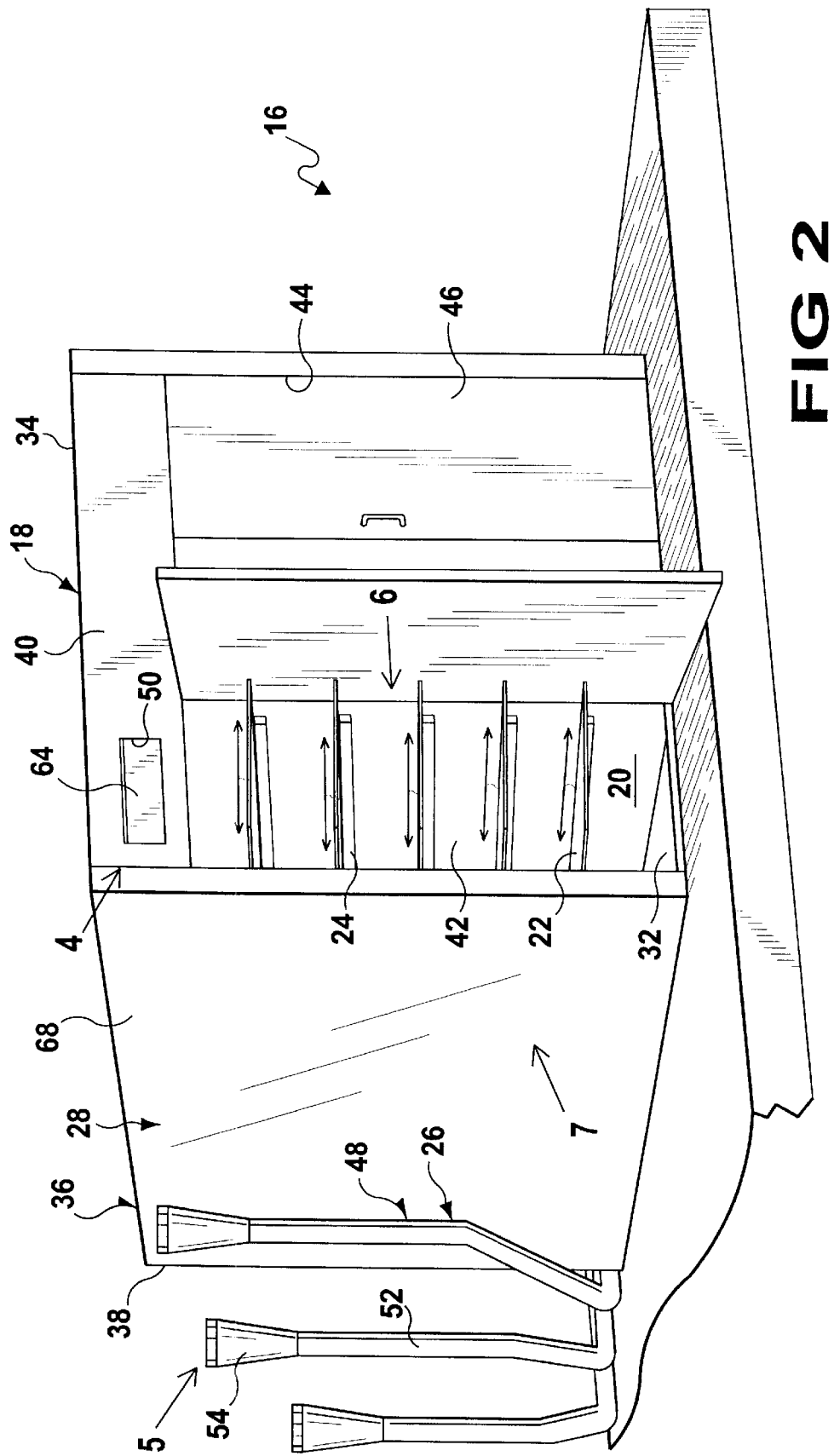
FIG. 2 is an enlarged perspective view of the first embodiment.
Figure 3:
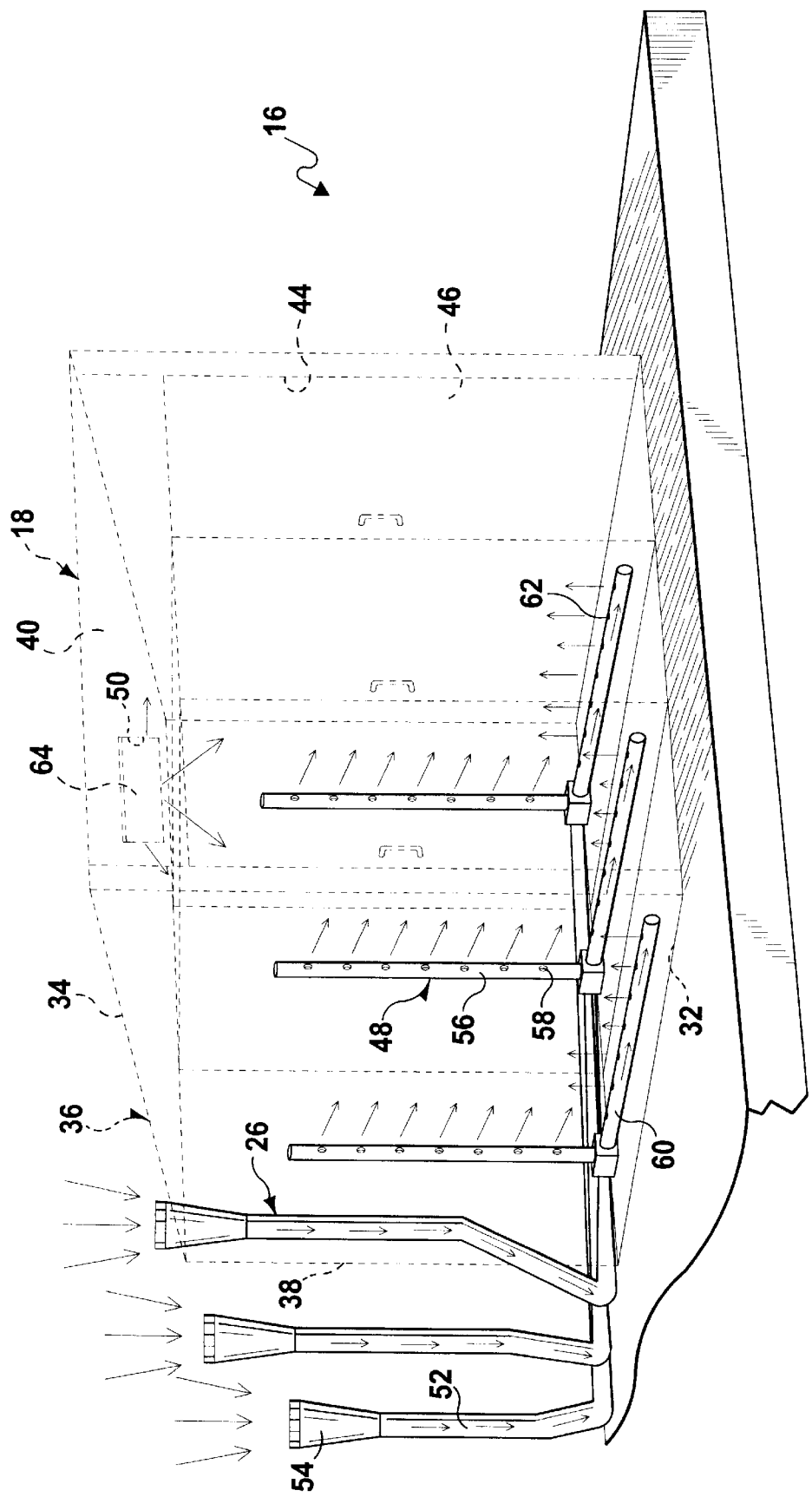
FIG. 3 is an enlarged perspective view similar to FIG. 2 with the enclosure in phantom, showing the air conduit system in greater detail.
Figure 4:
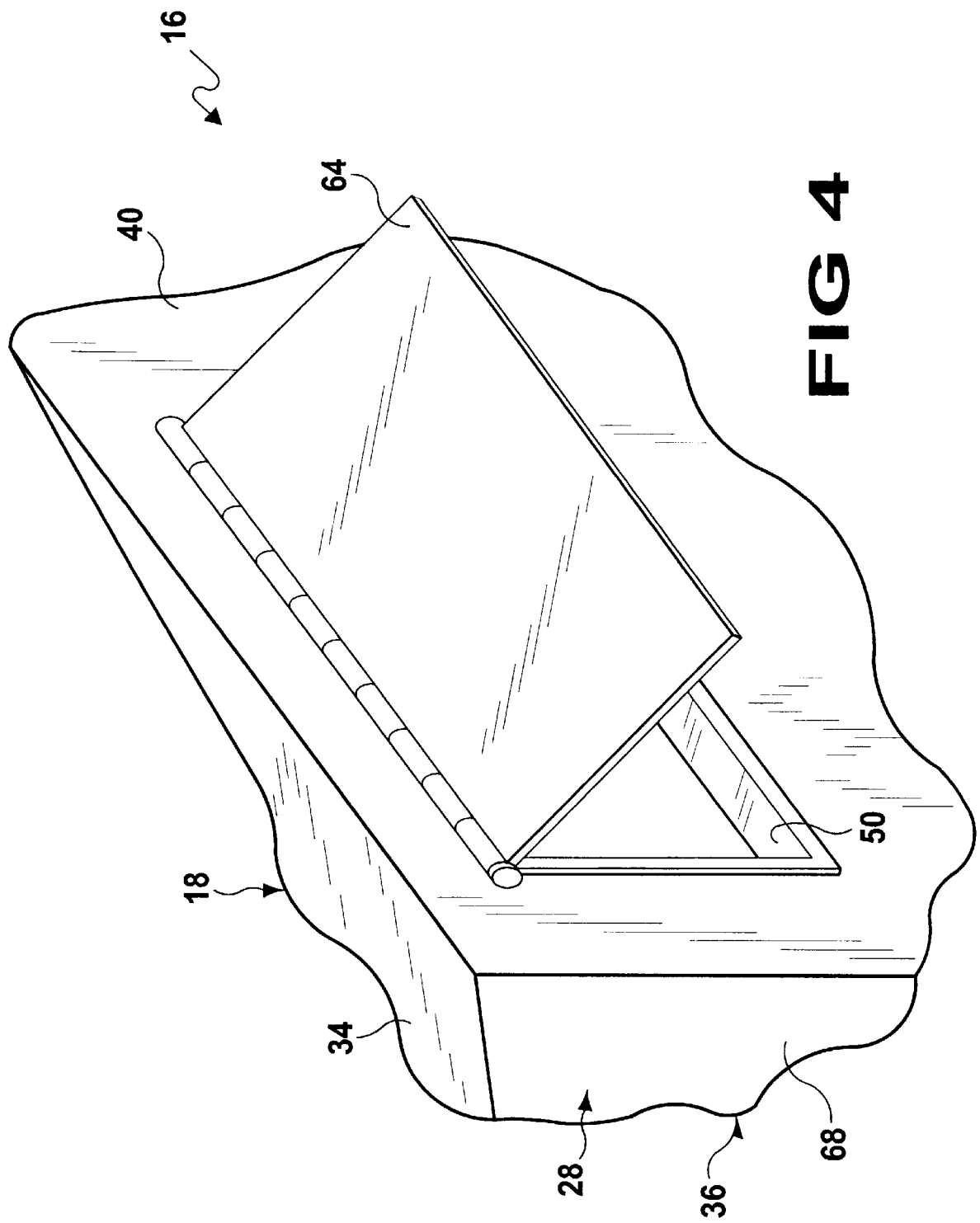
FIG. 4 is an enlarged perspective view of the vent, as indicated by arrow 4 in FIG. 2.
Figure 5:
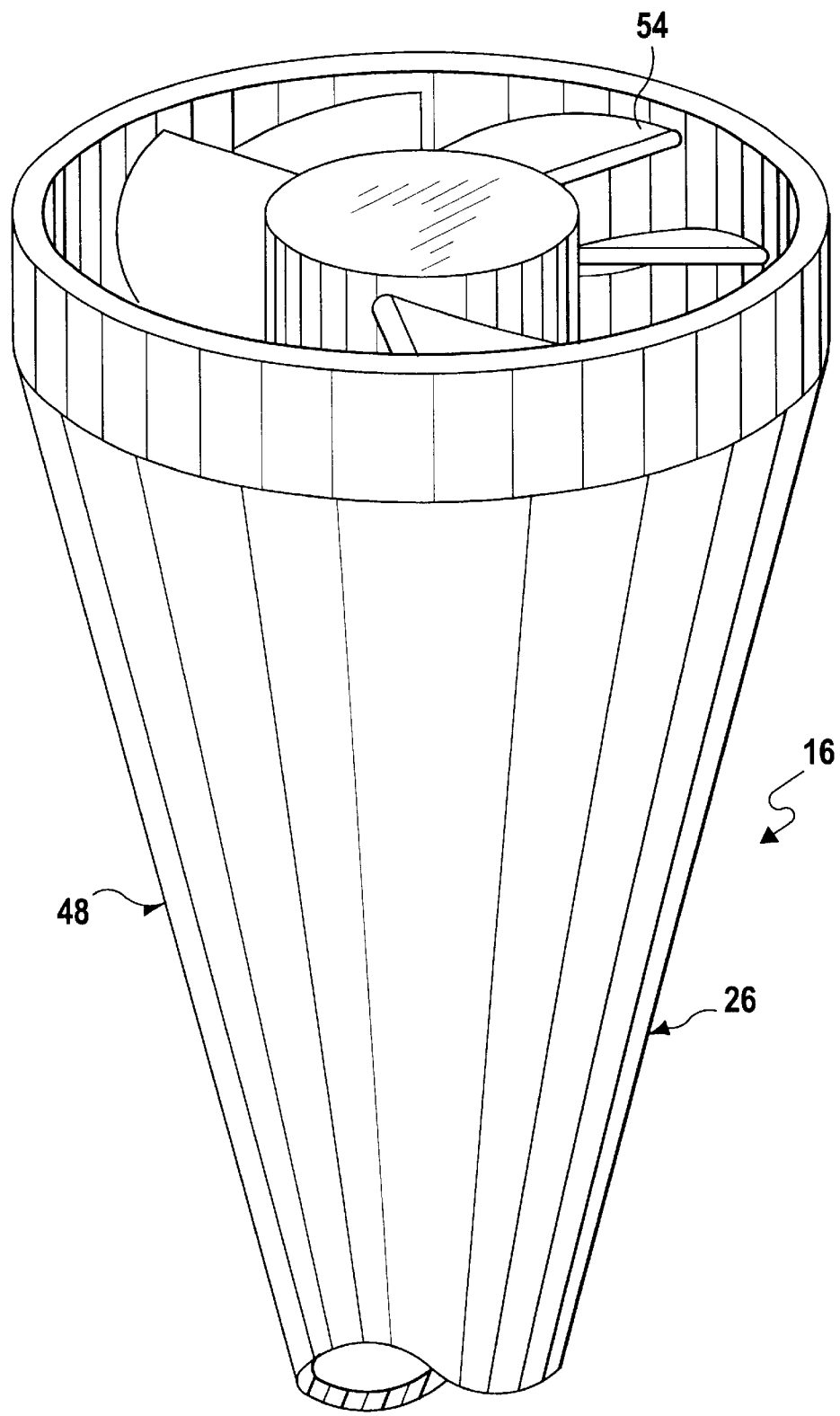
FIG. 5 is an enlarged perspective view of one of the self propelled fans indicated by arrow 5 in FIG. 2.
Figure 6:
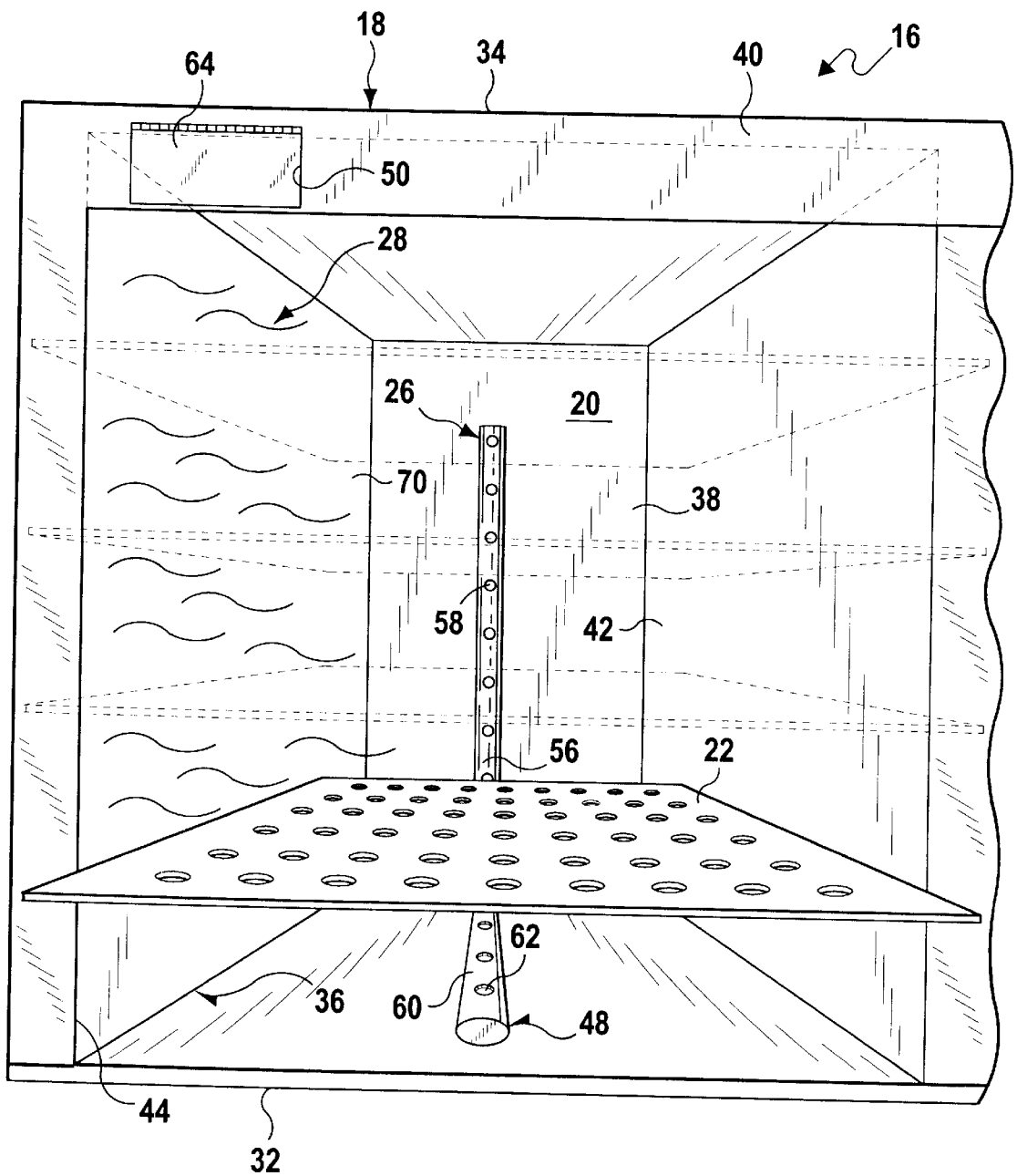
FIG. 6 is an enlarged perspective view, showing the drying chamber within the enclosure taken in the direction of arrow 6 in FIG. 2, with parts broken away.
Figure 7:
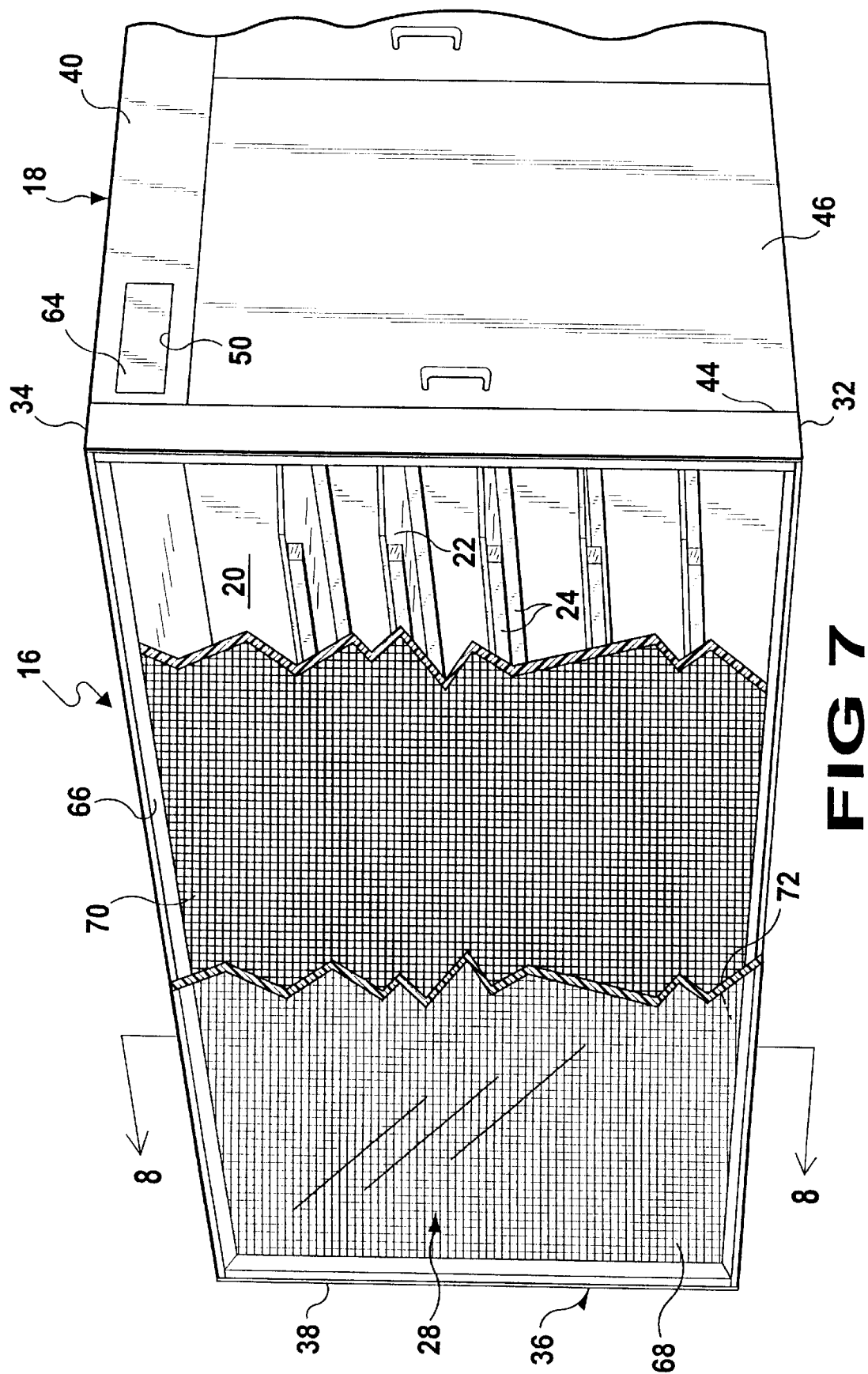
FIG. 7 is an enlarged perspective view taken in the direction of arrow 7 in FIG. 2, with parts broken away showing the outer transparent panel and the inner black panel in the exterior side wall of the enclosure in greater detail.
Figure 8:
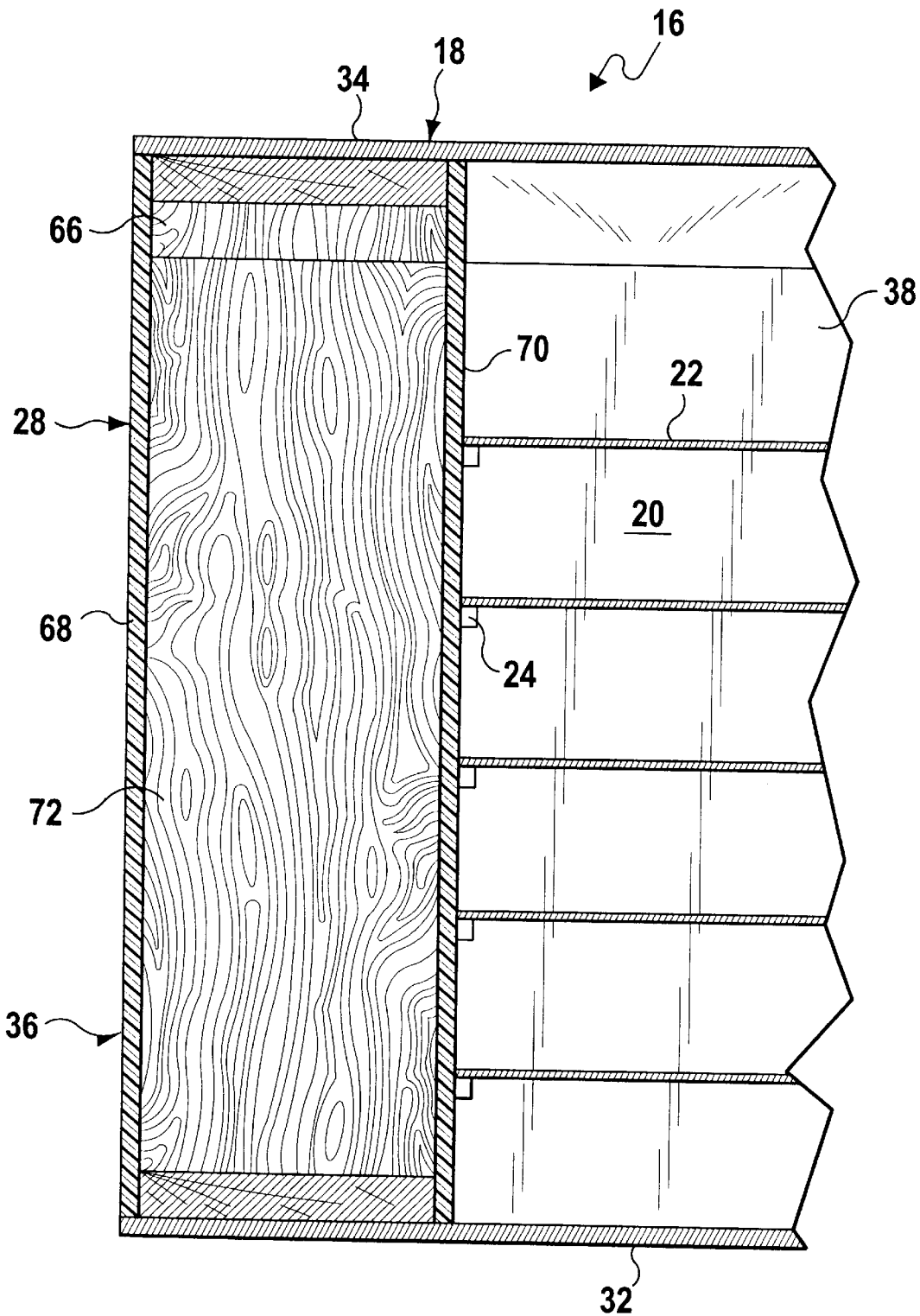
FIG. 8 is a cross sectional view taken along line 8—8 in FIG. 7, with parts broken away.

Turning now descriptively to the drawings, in which similar reference characters denote similar elements throughout the several views, FIGS. 1 through 14 illustrate the present invention being a thermal solar dehydrator 16 and 16a. With regard to the reference numerals used, the following numbering is used throughout the various drawing figures.

16 thermal solar dehydrator
16a modified thermal solar dehydrator
18 enclosure of 16
20 drying chamber in 18
22 perforated tray of 16
24 runner of 16
26 air forcing structure of 16
28 air allowing assembly of 16
30 sunlight
32 bottom wall of 18
34 top wall of 18
36 side wall of 18
38 rear wall of 18
40 front wall of 18
42 vertical interior partition of 18
44 large opening in 40
46 door on 40
48 air conduit system of 26
50 air vent of 26
52 air intake pipe of 48
54 fan of 48
56 vertical air pipe of 48
58 hole in 56
60 horizontal air pipe of 48
62 hole in 60
64 flap of 50
66 frame of 28 in 36
68 outer transparent panel of 28 on 66
70 inner black panel of 28 on 66
72 sealed plenum of 28
74 transparent air inflatable bag of 28
76 photovoltaic cell of 48
78 battery of 48
80 heat lamp of 48
82 thermostat of 48
84 cover of 54
86 screen of 54
88 damper of 54
90 transparent divider plate of 16a
92 transparent air inflatable bag in 72
94 transparent water inflatable bag in 72

The thermal solar dehydrator 16, as shown in FIGS. 1 through 9, comprises an enclosure 18 having a plurality of drying chambers 20 therein. A plurality of perforated trays 22 are provided. A plurality of runners 24 support the perforated trays 22 in vertically spaced apart relationships within the drying chambers 20 of the enclosure 18, so that food can be placed upon the perforated trays 22. A structure 26 is for forcing air into and out of the drying chambers 20. An assembly 28 is for allowing sunlight 30 to penetrate the enclosure 18 and heat up the air passing through the drying chambers 20, so that the food placed upon the perforated trays 22 will dehydrate.

The enclosure 18 includes a bottom wall 32 and a top wall 34. A pair of side walls 36 extend upwardly between the bottom wall 32 and the top wall 34. A rear wall 38 extends upwardly between the bottom wall 32 and the top wall 34. A front wall 40 extends upwardly between the bottom wall 32 and the top wall 34. A plurality of vertical interior partitions 42 divide the enclosure 18 into the drying chambers 20. The front wall 40 has a large opening 44 therethrough to gain access into the drying chambers 20. A plurality of doors 46 are each hingedly mounted to the front wall 40 and are adapted to seal each of the drying chambers 20, when each door 46 is in its closed position.

The air forcing structure 26 consists of an air conduit system 48 extending through the rear wall 38 of the enclosure 18, to bring air into the drying chambers 20. An air vent 50 is in the front wall 40 of the enclosure 18, so that the heated air can exit through the air vent 50.

The air conduit system 48 comprises a plurality of air intake pipes 52. Each air intake pipe 52 extends through a bottom portion of the rear wall 38 of the enclosure 18 and into one drying chamber 20. A plurality of fans 54 are provided. Each fan 54 is mounted to a first end of one air intake pipe 52 remote from the enclosure 18. A plurality of vertical air pipes 56 are provided. Each vertical air pipe 56 has a plurality of holes 58 and is mounted to a second end of one air intake pipe 52 in one drying chamber 20, and extends upwardly against the rear wall 38 of the enclosure 18.

A plurality of horizontal air pipes 60 are also provided. Each horizontal air pipe 60 has a plurality of holes 62 and is mounted to the second end of one air intake pipe 52 in one drying chamber 20 and extends forwardly against the bottom wall 32 of the enclosure 18. The fans 54 will force air through the air intake pipes 52 and out of the holes 58 in the vertical air pipes 56 and the holes 62 in the horizontal air pipes 60.

The air vent 50 includes a flap 64 hingedly mounted along a top edge of the air vent 50, which will open to allow the air to exit from the air vent 50. The air allowing assembly 28 consists of each side wall 36 having a frame 66, an outer transparent panel 68 attached to the exterior of the frame 66 and an inner black panel 70 attached to the interior of the frame 66, forming a sealed plenum 72 therebetween, so that the sunlight 30 can pass through the outer transparent panel 68 and heat up the inner black panel 70 and the air within the drying chambers 20.

Figure 9:
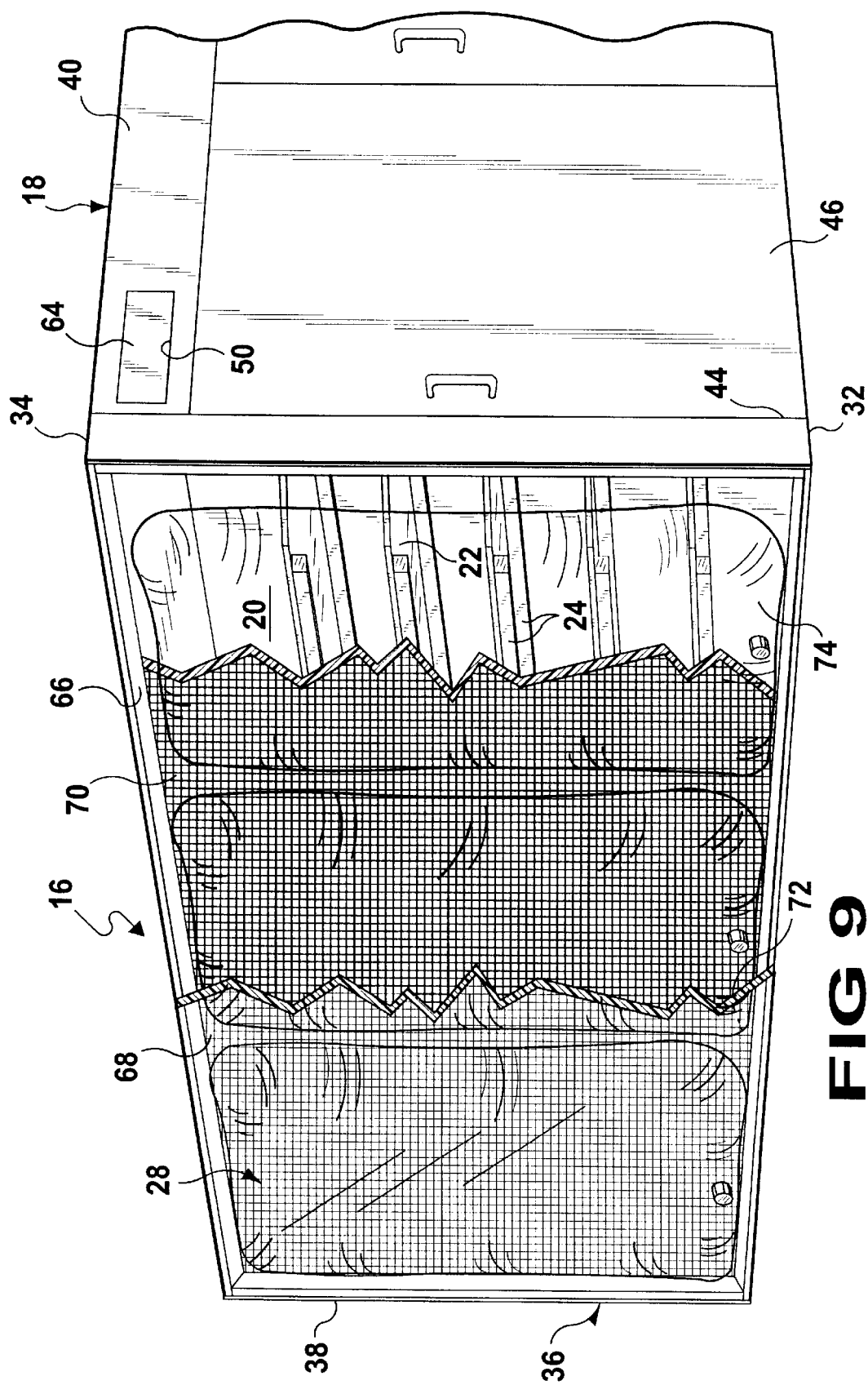
FIG. 9 is a perspective view similar to FIG. 7, showing transparent plastic bags filled with air to form a plenum between the outer transparent panel and the inner black panel in the exterior side wall of the enclosure.
Figure 10:
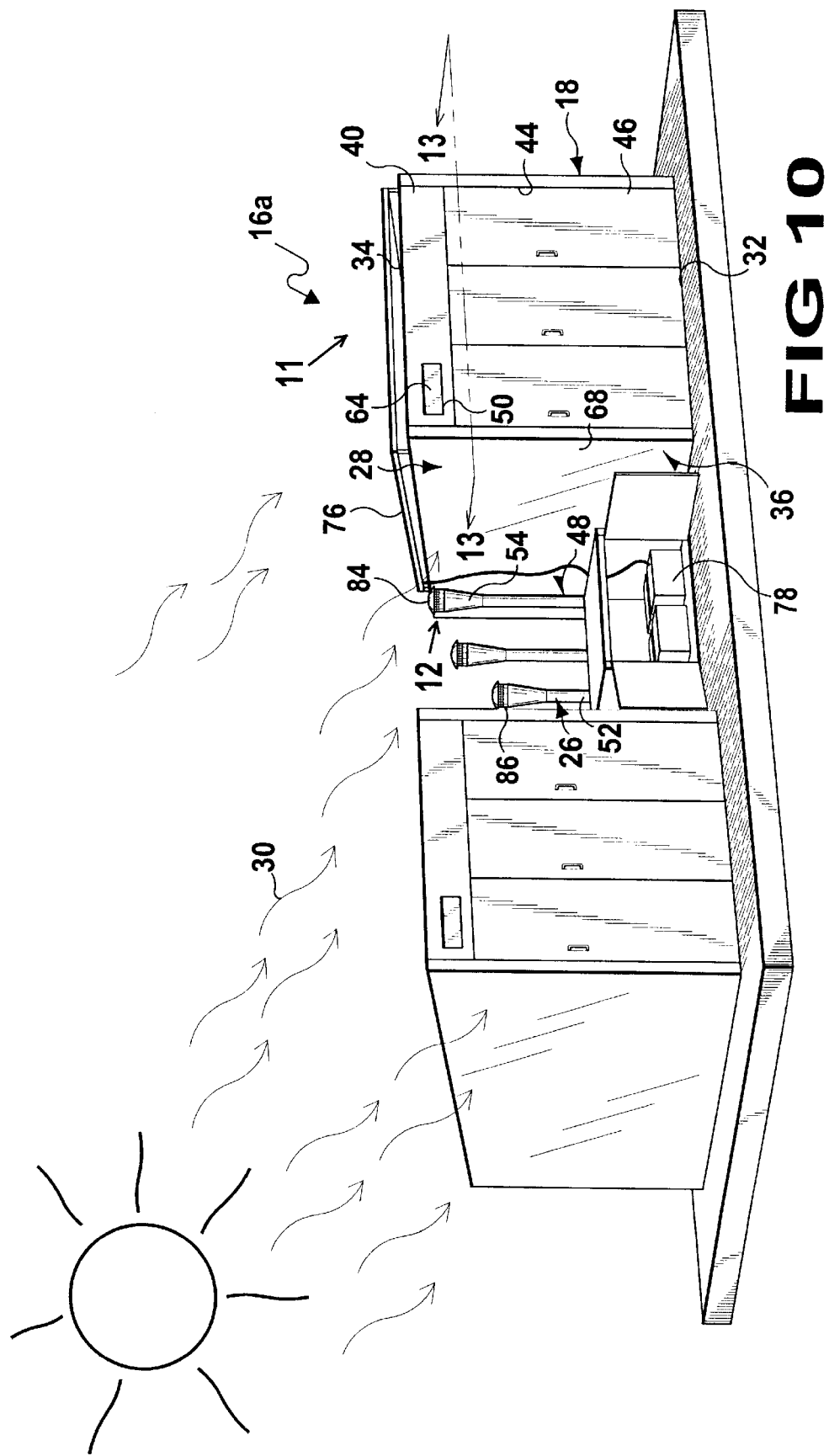
FIG. 10 is a perspective view similar to FIG. 1, showing a second embodiment of the present invention next to a storage cabinet.
Figure 11:
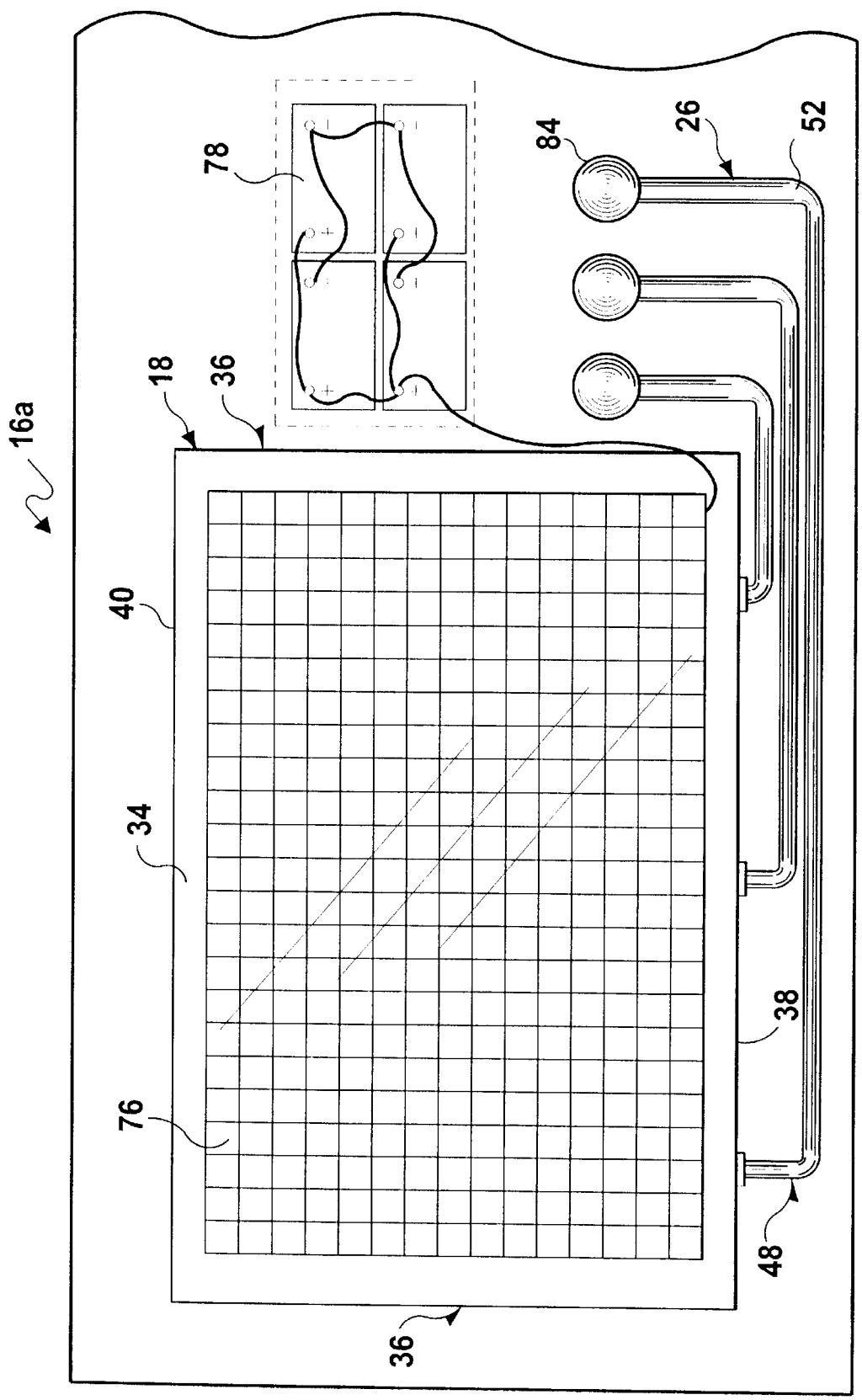
FIG. 11 is a top plan view taken in the direction of arrow 11 in FIG. 10, showing the photovoltaic cells on the roof of the enclosure electrically connected to the batteries.
Figure 12:
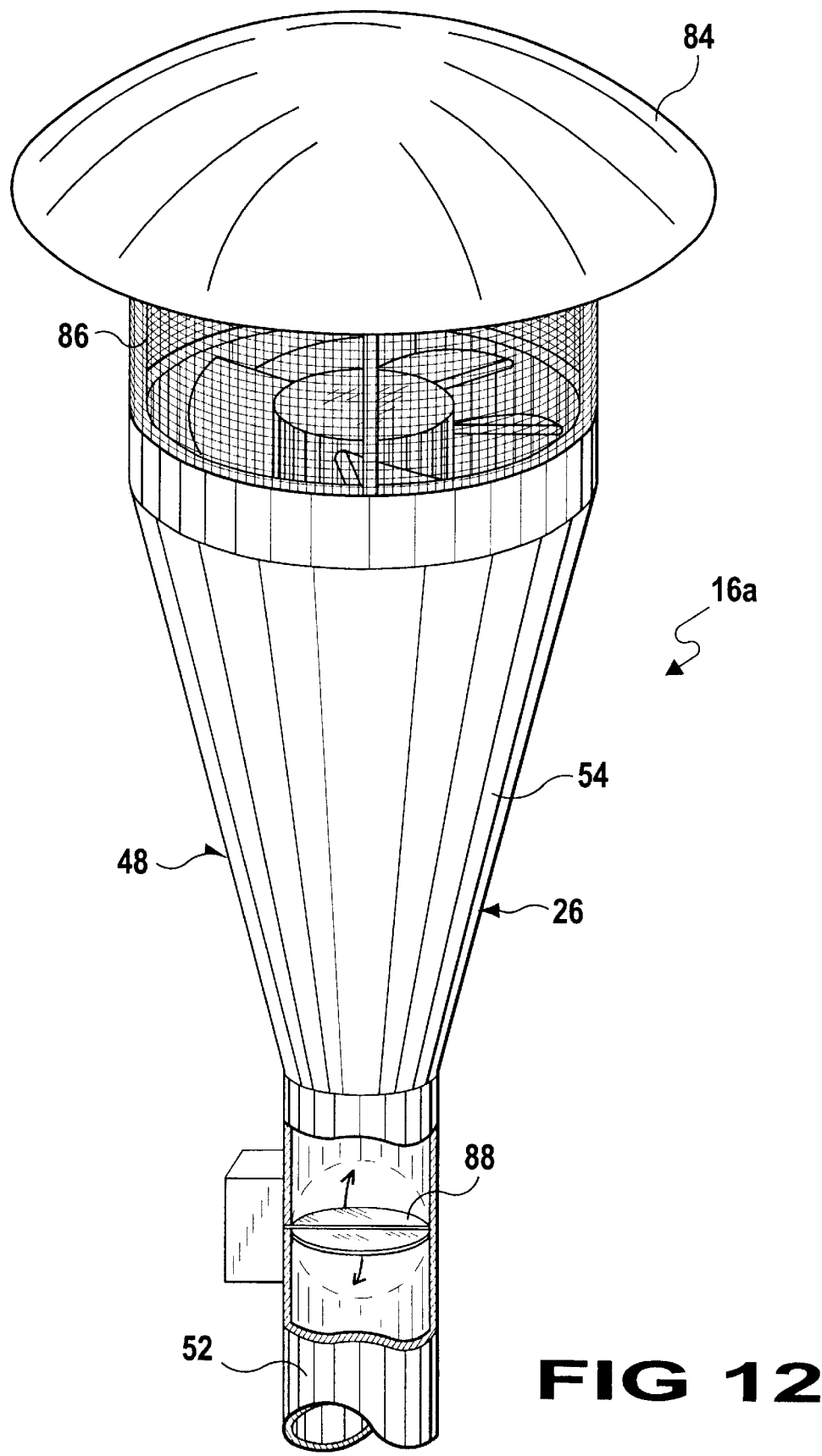
FIG. 12 is an enlarged perspective view of one of the electrically operated fans as indicated by arrow 12 in FIG. 10.

In FIG. 9, a plurality of transparent air inflatable bags 74 are inserted within the sealed plenum 72 between the outer transparent panel 68 and the inner black panel 70, to increase the heat retention capabilities of the sealed plenum 72.

A modified thermal solar dehydrator 16a is shown in FIGS. 10 through 14, wherein the air conduit system 48 further includes a plurality of photovoltaic cells 76 mounted onto the top wall 32 to convert the sunlight 30 into electricity. A plurality of batteries 78 are electrically connected to the photovoltaic cells 76, so that the electricity can be stored within the batteries 78. A plurality of heat lamps 80 are provided, with each mounted within one drying chamber 20. A plurality of thermostats 82 are also provided. Each thermostat 82 is mounted within one drying chamber 20 and is electrically connected between the batteries 78, one fan 54 and one heat lamp 80. The fans 54 and the heat lamps 80 can be turned on and off by the thermostats 54, to regulate the air temperature within the drying chambers 20.

Each fan 54 includes a cover 84 to keep out rain and debris and a screen 86 to protect the fan 54 from insects. Each fan 54 contains a damper 88 which can be closed when the fan 54 is not operating.

Figure 13:
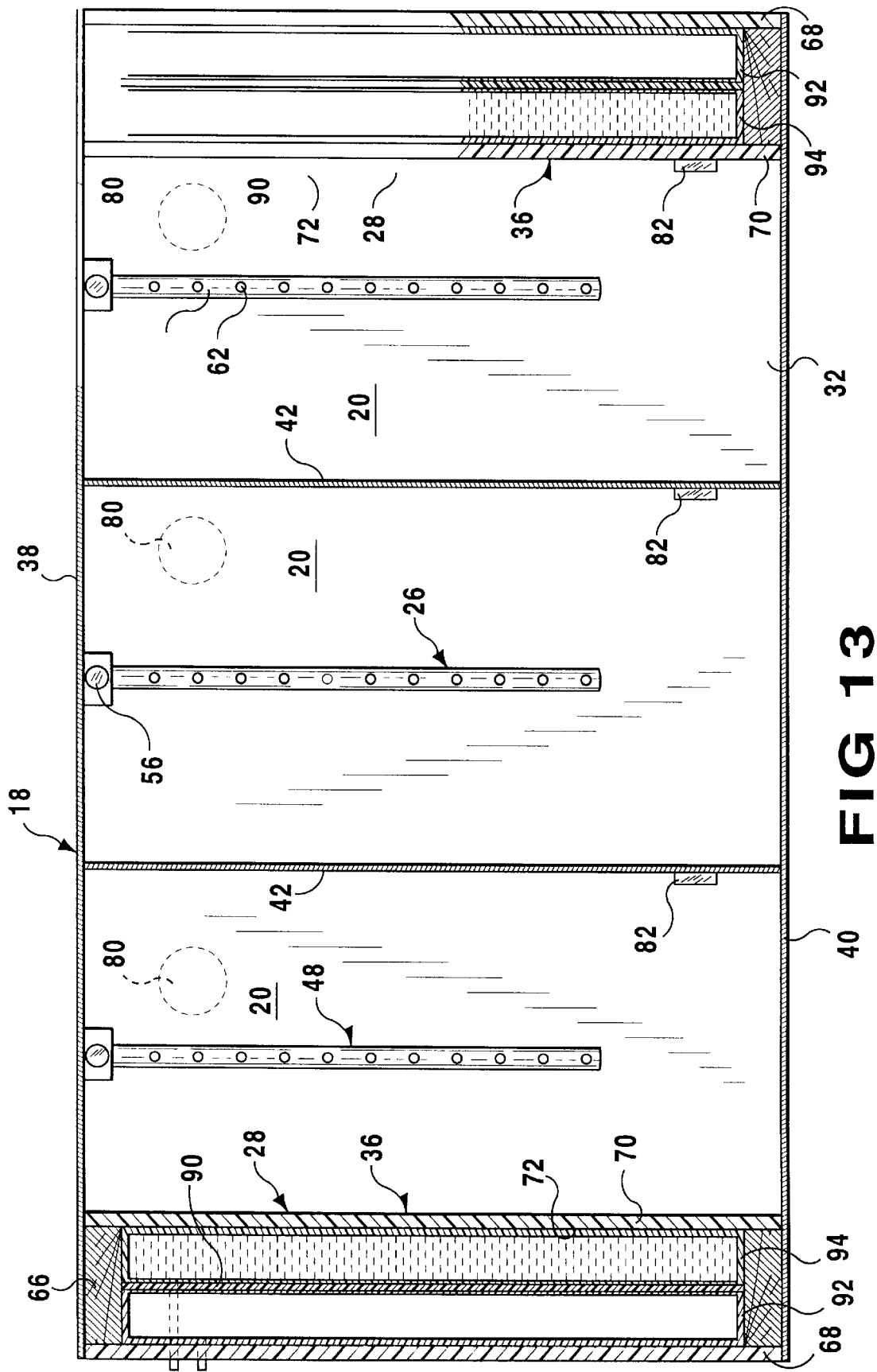
FIG. 13 is an enlarged cross sectional view taken along line 13—13 in FIG. 10.
Figure 14:
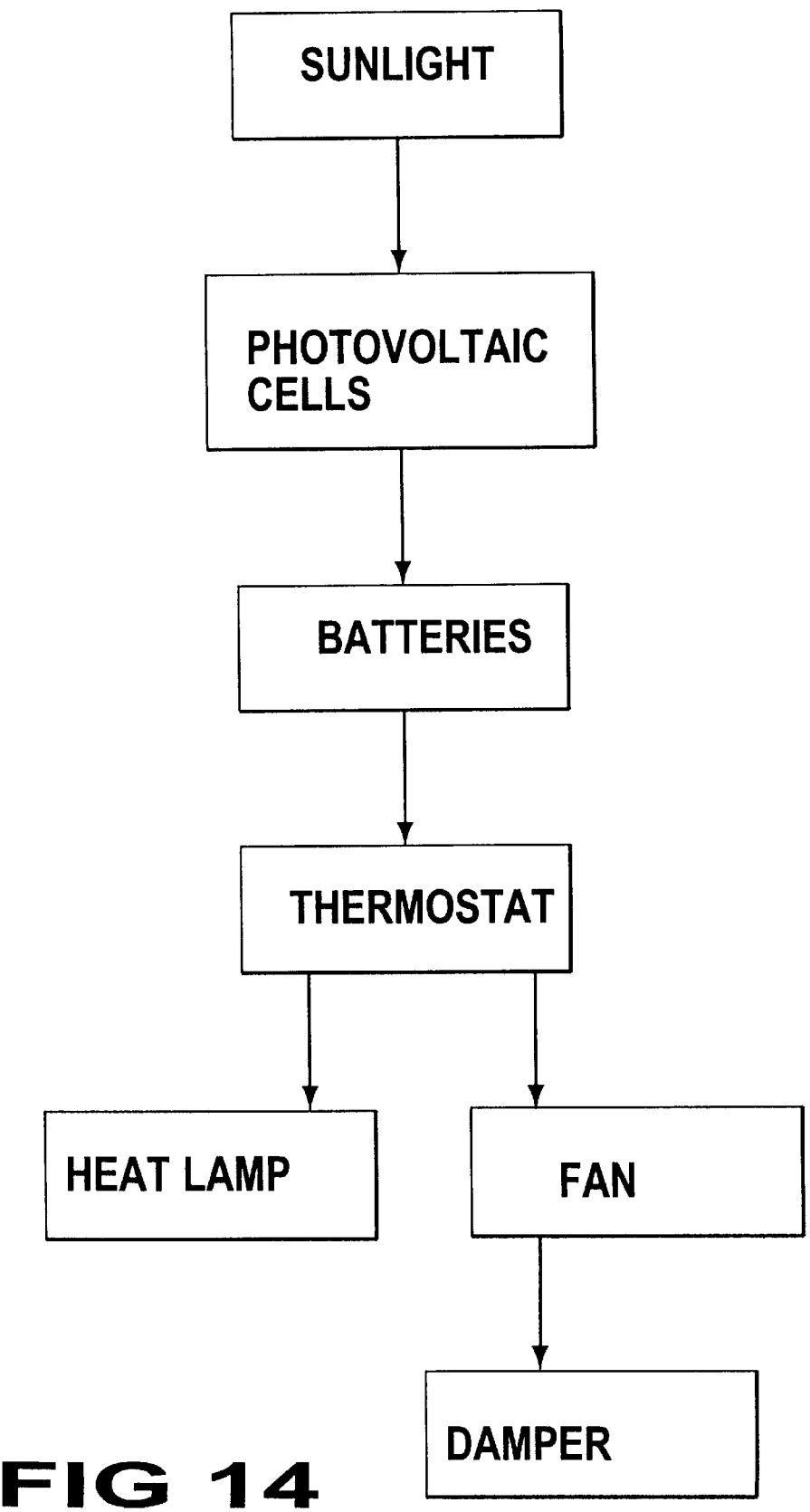
FIG. 14 is a diagrammatic block diagram, showing the operation of the second embodiment.

As shown in FIG. 13, a transparent divided plate 90 is inserted within the sealed plenum 72, so as to divide the sealed plenum 72 into two segments. A transparent air inflatable bag 92 is inserted within the first segment of the sealed plenum 72 between the outer transparent panel 68 and the transparent divider plate 90. A transparent water inflatable bag 94 is inserted within the second segment of the sealed plenum 72 between the transparent divider plate 90 and the inner black panel 70, so as to prevent an abrupt change in temperature within the drying chambers 20, which can occur during a rainstorm and a prolonged cloud cover.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A thermal solar dehydrator comprising:

a) an enclosure having a plurality of drying chambers therein, said enclosure further including a bottom wall; a top wall; a pair of side walls extending upwardly between said bottom wall and said top wall; a rear wall extending upwardly between said bottom wall and said top wall, a front wall extending upwardly between said bottom wall and said top wall; a plurality of vertical interior partitions to divide said enclosure into said drying chambers; said front wall having a large opening therethrough to gain acess into said drying chambers; and a plurality of door, each hingedly mounted to said front wall and adapted to seal each of said drying chambers when each said door is in its closed position;

b) a plurality of perforated trays;

c) a plurality of runners to support said perforated trays in vertically spaced apart relationships within said drying chambers of said enclosure, so that food can be placed upon said perforated trays;

d) means for forcing air into and out of said drying chambers, said air forcing means including an air conduit system extending through said rear wall of said enclosure to bring air into said drying chambers; and an air vent in said front wall of said enclosure, so that the heated air can exit through said air vent, said air vent including a flap hingedly mounted along a top edge of said air vent, which will open to allow the air to exit from said air vent; and e) means for allowing sunlight to penetrate said enclosure and heat up the air passing through said drying chambers, so that the food placed upon said perforated trays will dehydrate.

2. A thermal solar dehydrator as recited in claim 1, wherein said air conduit system includes:

a) a plurality of air intake pipes, in which each said air intake pipe extends through a bottom portion of said rear wall of said enclosure and into one said drying chamber;

b) a plurality of fans, in which each said fan is mounted to a first end of one said air intake pipe remote from said enclosure;

c) a plurality of vertical air pipes, in which each said vertical air pipe has a plurality of holes and is mounted to a second end of one said air intake pipe in one said drying chamber, and extends upwardly against said rear wall of said enclosure; and d) a plurality of horizontal air pipes, in which each said horizontal air pipe has a plurality of holes and is mounted to the second end of one said air intake pipe in one said drying chamber and extends forwardly against said bottom wall of said enclosure, whereby said fans will force air through said air intake pipes and out of said holes in said vertical air pipes and said holes in said horizontal air pipes.

3. A thermal solar dehydrator comprising:

a) an enclosure having a plurality of drying chambers therein said enclosure further including a bottom wall; a top wall; a pair of side walls extending upwardly between said bottom wall and said top wall; a rear wall extending upwardly between said bottom wall and said top wall; a front wall extending upwardly between said bottom wall and said top wall; a plurality of vertical interior partitions to divide said enclosure into said drying chambers; said front wall having a large opening therethrough to gain access into said drying chambers; and a plurality of doors, each hingedly mounted to said front wall and adapted to seal each of said drying chambers when each said door is in its closed position;

b) a plurality of perforated trays;

c) a plurality of runners to support said perforated trays in vertically spaced apart relationships within said drying chambers of said enclosure, so that food can be placed upon said perforated trays;

d) means for forcing air into and out of said drying chambers; and e) means for allowing sunlight to penetrate said enclosure and heat up the air passing through said drying chambers, so that the food placed upon said perforated trays will dehydrate, wherein said air allowing means includes each said side wall having a frame, an outer transparent panel attached to the exterior of said frame and an inner black panel attached to the interior of said frame forming a sealed plenum therebetween, so that the sunlight can pass through said outer transparent panel and heat up said inner black panel and the air within said drying chambers.

4. A thermal solar dehydrator as recited in claim 3, further including a plurality of transparent air inflatable bags inserted within said sealed plenum between said outer transparent panel and said inner black panel, to increase the heat retention capabilities of said sealed plenum.

5. A thermal solar dehydrator as recited in claim 2, wherein said air conduit system further includes:

a) a plurality of photovoltaic cells mounted onto said top wall to convert the sunlight into electricity;

b) a plurality of batteries electrically connected to said photovoltaic cells, so that the electricity can be stored within said batteries;

c) a plurality of heat lamps, each mounted within one said drying chamber; and d) a plurality of thermostats, each mounted within one said drying chamber and electrically connected between said batteries, one said fan and one said heat lamp, so that said fans and said heat lamps can be turned on and off by said thermostats to regulate the air temperature within said drying chambers.

6. A thermal solar dehydrator as recited in claim 2, wherein each said fan includes:

a) a cover to keep out rain and debris; and b) a screen to protect said fan from insects.

7. A thermal solar dehydrator as recited in claim 2, wherein each said fan includes a damper which can be closed when said fan is not operating.

8. A thermal solar dehydrator as recited in claim 3, further including:

a) a transparent divider plate inserted within said sealed plenum, so as to divide said sealed plenum into two segments;

b) a transparent air inflatable bag inserted within said first segment of said sealed plenum between said outer transparent panel and said transparent divider plate; and c) a transparent water inflatable bag inserted within said second segment of said sealed plenum between said transparent divider plate and said inner black panel, so as to prevent an abrupt change in temperature within said drying chambers, which can occur during a rainstorm and a prolonged cloud cover.

9. A thermal solar dehydrator as recited in claim 2, wherein said air allowing means includes each said side wall having a frame, an outer transparent panel attached to the exterior of said frame and an inner black panel attached to the interior of said frame forming a sealed plenum therebetween, so that the sunlight can pass through said outer transparent panel and heat up said inner black panel and the air within said drying chambers.

10. A thermal solar dehydrator as recited in claim 9, further including a plurality of transparent air inflatable bags inserted within said sealed plenum between said outer transparent panel and said inner black panel, to increase the heat retention capabilities Of said sealed plenum.

11. A thermal solar dehydrator as recited in claim 9, wherein said air conduit system further includes:

a) a plurality of photovoltaic cells mounted onto said top wall to convert the sunlight into electricity;

b) a plurality of batteries electrically connected to said photovoltaic cells, so that the electricity can be stored within said batteries;

c) a plurality of heat lamps, each mounted within one said drying chamber; and d) a plurality of thermostats, each mounted within one said drying chamber and electrically connected between said batteries, one said fan and one said heat lamp, so that said fans and said heat lamps can be turned on and off by said thermostats to regulate the air temperature within said drying chambers.

12. A thermal solar dehydrator as recited in claim 11, wherein each said fan includes:

a) a cover to keep out rain and debris; and b) a screen to protect said fan from insects.

13. A thermal solar dehydrator as recited in claim 12, wherein each said fan includes a damper which can be closed when said fan is not operating.

14. A thermal solar dehydrator as recited in claim 13, further including:

a) a transparent divider plate inserted within said sealed plenum, so as to divide said sealed plenum into two segments;

b) a transparent air inflatable bag inserted within said first segment of said sealed plenum between said outer transparent panel and said transparent divider plate; and c) a transparent water inflatable bag inserted within said second segment of said sealed plenum between said transparent divider plate and said inner black panel, so as to prevent an abrupt change in temperature within said drying chambers, which can occur during a rainstorm and a prolonged cloud cover.

* * * * *